United States Patent [19]
Flickinger et al.

[11] 3,860,610
[45] Jan. 14, 1975

[54] SANDWICH-TYPE CHEMICAL COMPOUNDS AND METHOD FOR THEIR PREPARATION

[75] Inventors: Earl Dan Flickinger, El Dorado; Charles Merlyn Buess, Wichita, both of Kans.

[73] Assignee: Skelly Oil Company, Tulsa, Okla.

[22] Filed: May 10, 1973

[21] Appl. No.: 359,126

Related U.S. Application Data

[60] Continuation of Ser. No. 68,047, Aug. 28, 1970, abandoned, which is a division of Ser. No. 706,663, Feb. 19, 1968, Pat. No. 3,577,431, which is a continuation-in-part of Ser. No. 554,651, June 2, 1966, abandoned.

[52] U.S. Cl. .......................................... 260/327 B
[51] Int. Cl. ............................................ C07d 27/28
[58] Field of Search ................................. 260/327 B

[56] References Cited
UNITED STATES PATENTS
3,577,431   5/1971   Flickinger et al. ................ 260/326.1

*Primary Examiner*—Henry H. Jiles
*Assistant Examiner*—C. M. S. Jaisle
*Attorney, Agent, or Firm*—Neuman, Williams, Anderson & Olson

[57] ABSTRACT

New compositions of matter having two ring nuclei composed of 6 carbon atoms essentially superimposed in fixed parallel planes with respect to each other and process of preparing the same.

4 Claims, No Drawings

SANDWICH-TYPE CHEMICAL COMPOUNDS AND METHOD FOR THEIR PREPARATION

This is a continuation of application Ser. No. 68,047, filed Aug. 28, 1970, now abandoned, which application is a division of Ser. No. 706,663, filed Feb. 19, 1968, now U.S. Pat. No. 3,577,431, patented May 4, 1971, which latter application is in turn a continuation-in-part of application Ser. No. 554,651, filed June 2, 1966, now abandoned.

This invention relates to new compositions of matter and methods of preparing the same.

The principal object of the invention is to prepare new chemical compounds having unique structure. The new compositions of the invention are chemicals having two ring nuclei composed of 6 carbon atoms essentially superimposed in fixed parallel planes with respect to each other. Unlike chain type polymer compounds, the compositions of the invention have a structure which can be characterized as "sandwich type" with the ring nuclei being essentially superimposed with respect to each other.

The new compositions of the invention are prepared by reacting substantially equal molar quantities of reactant A with reactant B in the presence of a solvent such as, for example, dimethylformamide, tetramethylene sulfone, water, ethanol, carbon tetrachloride and the like. In a preferred embodiment compounds reactive with alcohols or mercaptans are employed in the reaction mixture to assist linking of the reactants. Representative of such linking agents are sodium hydroxide, sodium hydride, potassium hydroxide, sodium diethyl amide, sodium amide and the like. The reaction, depending upon the particular substituents of the reactants, is carried out at temperatures from about 0° to about 200° C., and generally 75° to 150° C.

The reaction scheme for preparation of the new compounds of the invention can be illustrated as follows utilizing reactants having a benzene ring nuclei as illustrative (however the saturation of the ring can vary and saturated 6 carbon member rings can be employed):

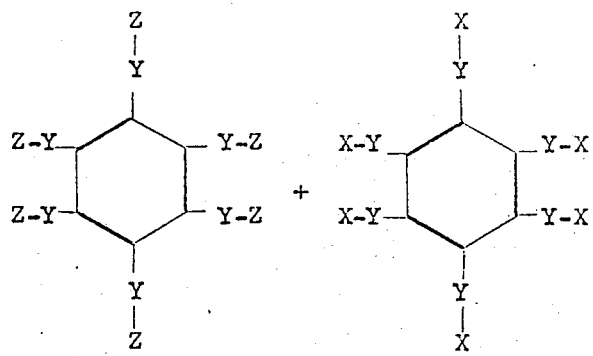

Reactant A     Reactant B     End Product (Formula I)

In the above formulae double bonds are indicated by heavy lines and each of the Reactants A and B can have from 3 to 6 Z-Y and X-Y groups respectively with
Y = ($CH_2$),
Z = $NR_2$, SR, OH, (R=H or alkyl of 1-4 carbon atoms),
X = Cl, Br, I,
W = NR, S, O, $NR_2^+X^-$ or $SR^+X^-$ (R=H or alkyl of 1-4 carbon atoms).

When there are less than 6 Z-Y or X-Y groups present in the reactants the other substituents present in the ring nuclei are hydrogen, alkyl, hydroxyl, methoxy, halogens and like substituents which do not interfere with the desired reaction.

As will be apparent from the above, reaction scheme W in certain instances represents ammonium or sulfonium salts. It is within the scope of the present invention to react three Z-Y groups with six X-Y groups to give a reaction product with six connections to one ring nucleus and three connections to the other ring nucleus and to isolate ammonium or sulfonium salts or amines therefrom, in which case the end product will have the formula indicated below with $$V = N, NR^+X^- \text{ or } S^+X^-:$$

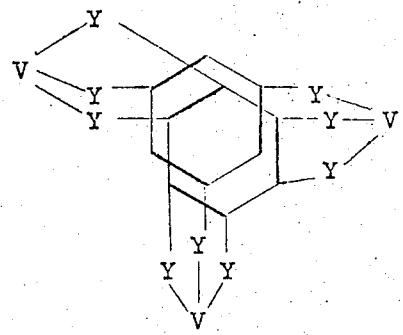

The following examples are illustrative of the present invention:

EXAMPLE I

Approximately 7.5 grams of hexabromomethylbenzene (Reactant B) are added to 100 milliliters of the solvent, tetramethylene sulfone. This mixture is heated to a temperature of approximately 140° C. and while maintaining this temperature approximately 3.3 grams of tri-(dimethylaminomethyl)phenol (Reactant A) are added. Heating is continued for 15-20 minutes. The reaction product is recovered by filtering the reaction mixture. The reaction is illustrated by the following scheme:

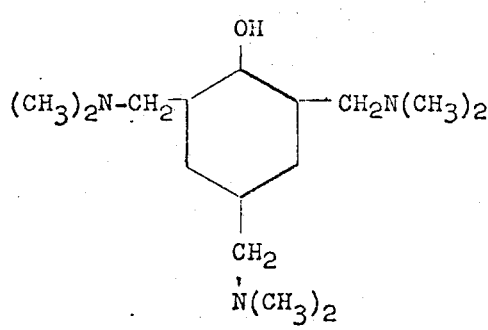 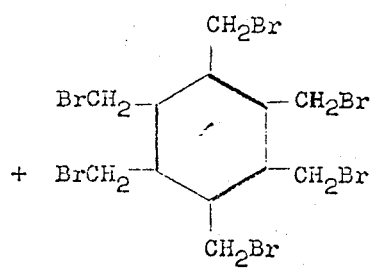 →

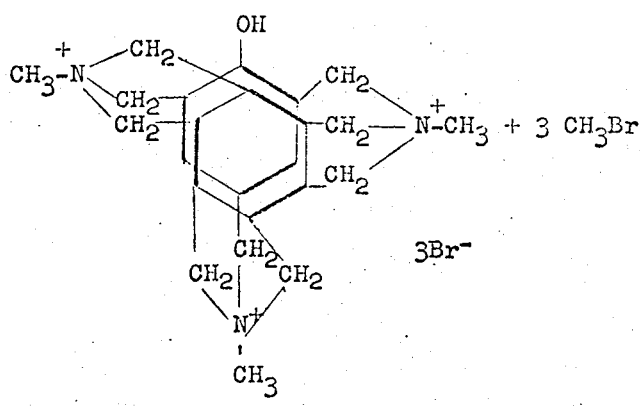

The reaction product is a solid which decomposes at temperatures above 200° C. and is soluble in water and insoluble in ethanol.

Analysis, Calculated for $C_{24}H_{30}N_3OBr_3 \cdot 4H_2O$: C, 41.9; H, 5.5; N, 6.1; Br, 34.9

Found: C, 41.7; H, 6.5; N, 6.2; Br, 32.6

EXAMPLE II

Five grams of the reaction product of Example I and 50 milliliters of triethylamine in 150 milliliters of absolute alcohol were refluxed for 2 hours. Then solvents were evaporated and the residue was washed with water. The molecular weight was determined on the resulting product having the formula shown below on a vapor pressure osmometer.

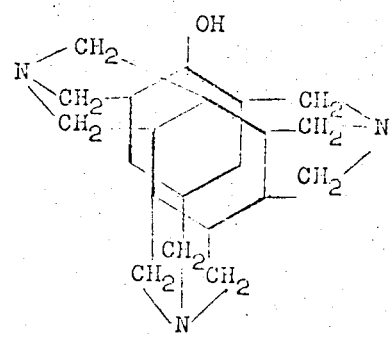

Calculated for $C_{21}H_{21}N_3O$: MW 331
Found: MW 348.

EXAMPLE III

In this example a reaction as follows was carried out:

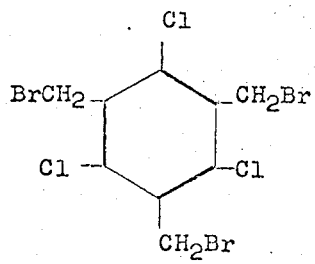 + 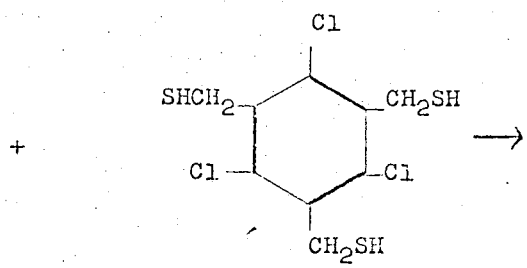 →

Reactant B                    Reactant A

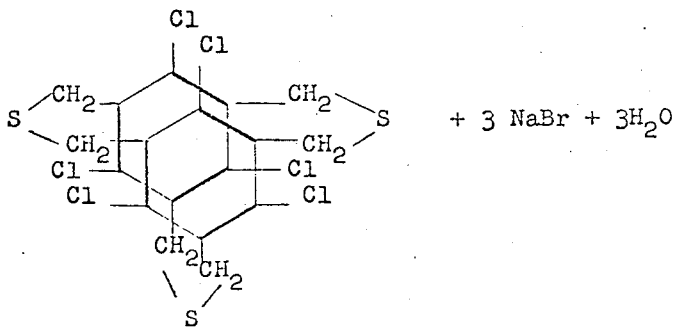

In carrying out the reaction depicted above a warm solution (50°–70° C.) of 1.620 grams of reactant A in 70 milliliters of carbon tetrachloride was filtered and treated with a solution of 0.8 grams of sodium hydroxide in 1 milliliter of water and 20 milliliters of ethanol. A warm solution (50°–70° C.) of 2.342 grams of reactant B dissolved in 50 milliliters of carbon tetrachloride was added and the mixture was refluxed 7 hours. The mixture was separated by filtration and the residue extracted successively with 75 milliliters of carbon tetrachloride and 75 milliliters water. The residue (1.7 grams) was dried 1 hour at 110° C. The product did not melt below 300° C.

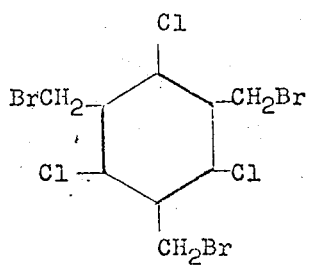

Reactant B

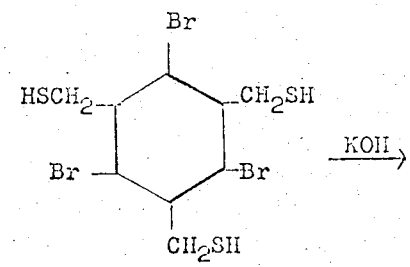

Reactant A

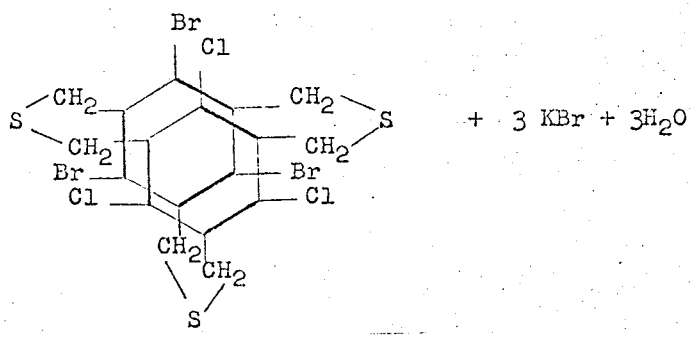

| Analyses calculated for $C_{18}H_{12}Cl_6S_3$: | | | | |
|---|---|---|---|---|
| | C | H | Cl | S |
| Theory | 40.22 | 2.23 | 39.66 | 17.88 |
| Found | 38.99 | 2.43 | 39.66 | 16.79 |

Reactant B involved in the above synthesis can be prepared by the method of Ross et al. as described in the *Journal of Organic Chemistry*, Vol. 25, page 2102, 1960.

Reactant A can be prepared from reactant B by converting the latter to a Bunte salt followed by acid hydrolysis. An example of this procedure is as follows:

A mixture of 2.3 grams of compound "B", 3.7 grams of sodium thiosulfate pentahydrate, 25 milliliters water, and 25 milliliters ethanol was stirred approximately four hours. A homogenous solution was formed during the first two hours. The solution was treated with 5 milliliters concentrated hydrochloric acid and the mixture was refluxed one hour. The mixture was cooled and filtered. The product was recrystallized from ethanol yielding 0.85 grams of reactant "A" melting at 155° C.

EXAMPLE IV

In this example a reaction was carried out as follows:

One gram of potassium hydroxide dissolved in 5 milliliters of 70% ethyl alcohol (30% water) was added to 1.51 grams of reactant A dissolved in carbon tetrachloride. This was reacted with 1.54 grams of reactant B dissolved in carbon tetrachloride at 50°–70° C. The reactant mixture was refluxed for 30 minutes. The mixture was separated by filtration and the residue extracted successively with hot carbon tetrachloride and deionized water. The residue was dried 1 hour at 110° C. One and two-tenth grams of a light yellow solid that did not melt below 300° C. was obtained.

Analyses calculated for $C_{18}H_{12}Br_3Cl_3S_3$:

| | C | H | Br | Cl | S |
|---|---|---|---|---|---|
| Theory | 32.2 | 1.8 | 35.8 | 15.9 | 14.3 |
| Found | 31.3 | 1.97 | 35.8 | 16.1 | 14.3 |

Reactant A was obtained as follows:

2,4,6 Trib(omomesitylene [G. F. Hennion et al., J. Amer. Chem. Soc. Vol. 68, page 424 (1946)] was brominated as follows:

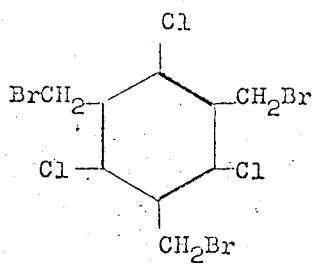

Reactant B

A boiling solution of 63 grams 2,4,6 tribromomesitylene in 350 milliliters carbon tetrachloride was irradiated with a 200-watt tungsten lamp and treated dropwise with 40 milliliters bromine during seven hours. The mixture was refluxed 15 hours, cooled, and filtered to give 22.1 grams 2,4,6 tribromo 1,3,5 tri (bromomethyl) benzene, melting at 220°–223° C.

Analysis calculated for $C_9H_6Br_6$:

| | Br |
|---|---|
| Theory | 80.78 |
| Found | 80.77 |

A mixture of 8.92 grams 2,4,6 tribromo - 1,3,5 tri (bromomethyl) benzene, 11.1 grams sodium thiosulfate pentahydrate, 75 milliliters ethanol and 75 milliliters water was stirred at 50°–60° C. for 7 hours and then at room temperature for 16 hours. The resultant solution was treated with 15 milliliters concentrated hydrochloric acid and this solution was refluxed 1.5 hours. The product reactant A, which was obtained by filtration in 4.7 grams yield, melted at 200° C.

Analysis calculated for $C_9H_9Br_3S_3$:

| | C | H |
|---|---|---|
| Theory | 23.86 | 2.00 |
| Found | 23.75 | 1.98 |

EXAMPLE V

In this example a reaction was carried out as follows:

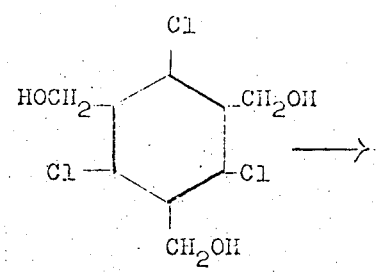

Reactant A

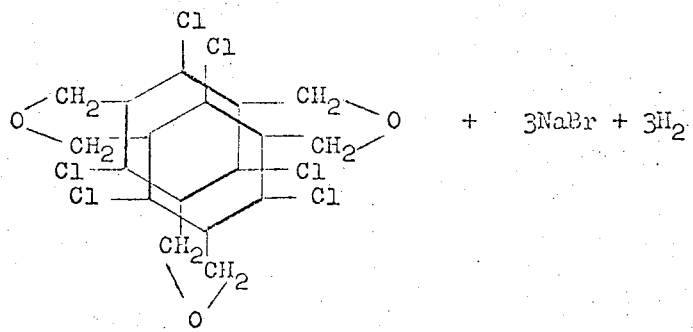 + $3NaBr + 3H_2$

In carrying out the above reaction a suspension of 0.55 grams of 51% sodium hydride in mineral oil in 60 milliliters diethylamine was stirred and heated until the sodium hydride had disappeared and a gelatinous precipitate separated. Then 1.01 grams of reactant A and 100 milliliters carbon tetrachloride was added. The mixture was distilled with addition of fresh carbon tetrachloride until the boiling point reached 76° C. (727 millimeters). Reactant B (1.8 grams) was then added and the mixture was heated 2 ½ hours at 70-76° C. The mixture was cooled and filtered. The residue was washed with hot deionized water and hot carbon tetrachloride to give a solid product which did not melt below 300° C.

Analyses calculated for $C_{18}H_{12}Cl_6O_3$:

| | C | H | Cl | O |
|---|---|---|---|---|
| Theory | 44.2 | 2.4 | 43.6 | 9.8 |
| Found | 43.76 | 3.48 | 43.12 | 9.92 |

Reactant A was prepared by the method of Ross et al., Journal of Organic Chemistry, Vol. 25, page 2104–1960.

EXAMPLE VI

In this example a reaction was carried out as follows:

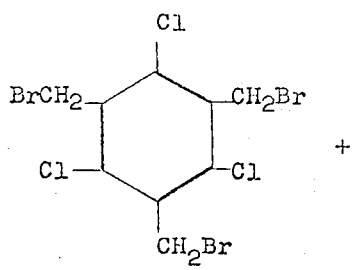

Reactant B

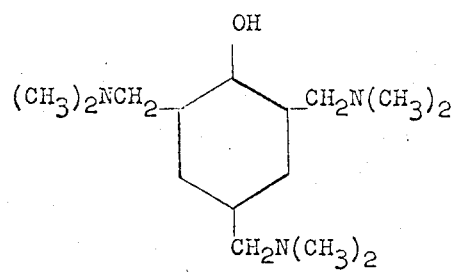

Reactant A

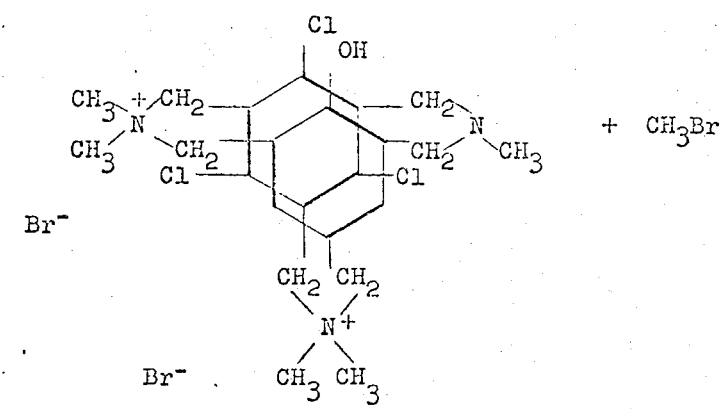

+ $CH_3Br$

In carrying out the above reaction 3.0 grams of reactant B were dissolved in carbon tetrachloride and the solution heated to boiling. To this solution was added 1.7 grams of reactant A (commercially available) dissolved in carbon tetrachloride. The reaction mixture was heated at a temperature of 65°–75° C. for 20 minutes. A white precipitate was formed which was filtered and washed with additional carbon tetrachloride then dried overnight in an oven at a temperature of 90° C. Two and one-tenth grams of product were obtained.

Anslysis calculated for $C_{23}H_{30}N_3Cl_3Br_2O$:

|  | C | H | N | Br | Cl |
|---|---|---|---|---|---|
| Theory | 43.74 | 4.75 | 6.66 | 25.35 | 16.96 |
| Found | 44.48 | 6.9 | 6.04 | 24.53 | — |

A reaction similar to the above was conducted at room temperature. Thus, 6.0 grams of compound B were reacted with 3.7 grams of compound A. The product was dried at room temperature; yield, 5.8 grams.

|  | C | H | N | Br | Cl |
|---|---|---|---|---|---|
| Found | 42.28 | 6.05 | 7.26 | 22.32 | 14.02 |

The chlorine atoms in the product produced above are easily replaced even on standing in air or while heating in an oven.

The sandwich structure of the product produced as above described was confirmed by dissolving 12.2 grams of the product in 650 milliliters deionized water. An excess of triethyl amine (38 milliliters) was added and the mixture heated to 75° C. for 40 minutes to remove methyl bromide. The top layer was extracted with benzene, filtered, evaporated, and dried. The residue was a viscous liquid. Analyses showed some of the chlorine was replaced.

Analyses calculated for $C_{21}H_{26}N_3Cl\ O_3$ (two chlorines replaced with two OH):

|  | MW | Cl |
|---|---|---|
| Theory | 403 | 8.68 |
| Found | 395 | 11.33 |

The compositions embraced by this invention have various utility. Thus, for example, methyl ammonium salts can be advantageously employed as methylating agents. The "sandwich" compositions of the present invention containing sulfur, oxygen and nitrogen can be advantageously employed in lubricating greases to impart extreme pressure characteristics thereto.

Those modifications and equivalents which fall within the spirit of the invention and the scope of the appended claims are to be considered part of the invention.

We claim:

1. A compound having two benzene ring nuclei composed of six carbon atoms essentially superimposed in fixed parallel planes with respect to each other and having the formula

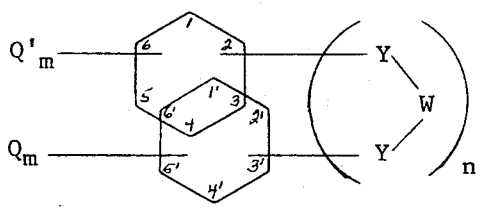

wherein
 Y = CH$_2$;
 W = S or SR$^+$X$^-$;
 R = H or C$_{1-4}$ alkyl;
 X = Cl, Br or I;
 n = 3 to 6;
 Q,Q' = H, OH, Cl or Br;
 m = 0 to 3; and
 m + n = 3 to 6;
provided further that —Y—W—Y— groups are joined to corresponding positions on each ring (1,1'), (2,2'), (3,3'), (4,4'), (5,5') and (6,6').

2. A compound having two ring nuclei composed of six carbon atoms essentially superimposed in fixed parallel planes with respect to each other and having the formula:

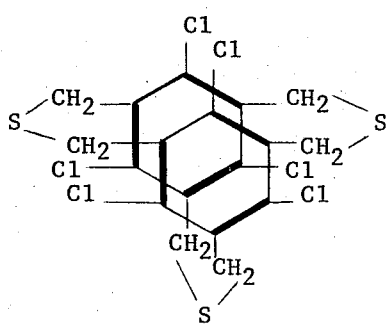

3. A compound having two ring nuclei composed of six carbon atoms essentially superimposed in fixed parallel planes with respect to each other and having the formula:

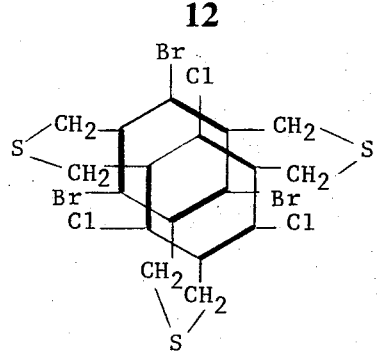

4. A process which comprises reacting in the presence of a solvent substantially equal molar proportions of a compound having the formula:

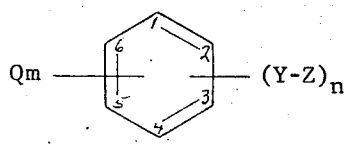

with a compound having the formula:

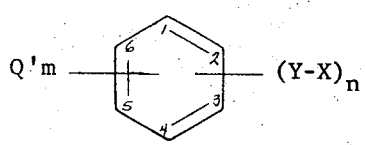

wherein
 Y = CH$_2$;
 Z = SR;
 R = H or alkyl of 1–4 carbon atoms;
 X = Cl, Br or I;
 Q,Q' = OH, Cl or Br;
 n = 3 to 6;
 m = 0 to 3; and
 m + n = 3 to 6.

* * * * *